United States Patent [19]

Sue et al.

[11] Patent Number: 5,489,657

[45] Date of Patent: Feb. 6, 1996

[54] BULK PROCESS FOR MAKING MALEIMIDE COPOLYMERS

[75] Inventors: Chen-Youn Sue, Williamstown; Gregory R. Prince, Sandyville, both of W. Va.; Stephen M. Campbell, Omro, Wis.

[73] Assignee: General Electric Company, Pittsfield, Mass.

[21] Appl. No.: 327,153

[22] Filed: Oct. 21, 1994

[51] Int. Cl.$^6$ ............................. C08F 2/02; C08F 222/40
[52] U.S. Cl. ............................. 526/65; 525/53; 525/73; 525/282
[58] Field of Search .................. 525/53, 73, 282; 526/65

[56] References Cited

U.S. PATENT DOCUMENTS

| | | |
|---|---|---|
| 3,652,726 | 3/1972 | Nield et al. . |
| 4,374,951 | 2/1983 | Lee et al. . |
| 4,567,233 | 1/1986 | Tomoso et al. . |
| 4,804,706 | 2/1989 | Kishida et al. . |
| 4,916,196 | 4/1990 | Aoki et al. . |
| 4,948,847 | 8/1990 | Morita et al. .............................. 526/64 |
| 5,091,470 | 2/1992 | Wolsink et al. . |
| 5,191,040 | 3/1993 | Okumura et al. .......................... 526/65 |
| 5,270,387 | 12/1993 | Sheilds et al. . |

FOREIGN PATENT DOCUMENTS

| | | |
|---|---|---|
| 0204548 | 10/1986 | European Pat. Off. . |
| 0222924 | 5/1987 | European Pat. Off. . |
| 63-182309 | 7/1988 | Japan . |
| 9125597 | 1/1991 | Japan . |
| 91208051 | 8/1991 | Japan . |
| 91247916 | 9/1991 | Japan . |
| 1175262 | 12/1969 | United Kingdom ..................... 525/53 |
| 8802380 | 4/1988 | WIPO . |

Primary Examiner—Vasu S. Jagannathan

[57] ABSTRACT

A bulk process is provided for making maleimide copolymers. The process involves reacting a monomer mixture comprising a maleimide monomer compound, a vinyl aromatic compound and a vinyl cyanide compound in a continuous stirred tank reactor, and then further reacting the material in a plug flow reactor to obtain a desired conversion level, and then devolatizing the product. The process provides enhanced oligomer control and enhanced levels of glass transition temperature and other properties. The maleimide copolymer obtained by the process may be further blended with impact modifiers to produce thermoplastic compositions which are useful for making molded articles such as automotive parts for under the hood applications, such as distributor caps.

21 Claims, No Drawings

BULK PROCESS FOR MAKING MALEIMIDE COPOLYMERS

BACKGROUND OF THE INVENTION

1. Field of the Invention

The present invention relates to bulk processes for making polymers, and more particularly relates to bulk processes for making maleimide copolymers.

2. Description of the Related Art

Maleimide copolymers, specifically N-phenylmaleimide-styrene-acrylonitrile copolymers are known. Processes for making the maleimide copolymers, have generally been complex, and have encountered difficulties including, for example, oligomer control. Undesirably high levels of oligomers in the final product can result in reduced glass transition temperatures and reduced levels of impact strength. Additionally, such processes have typically encountered some difficulties with compositional drift control, particularly in the suspension and emulsion processes. Additionally, various processes, such as bulk processes which employ continuous stirred tank reactors, have typically resulted in undesirably high levels of residual maleimide monomer, specifically N-phenylmaleimide monomer which can have the undesirable effect of producing product with an undesirably high yellowness index.

Accordingly, there is a desire to provide a process which will produce maleimide copolymers exhibiting enhanced glass transition temperatures, reduced levels of yellowness, and reduced levels of viscosity.

SUMMARY OF THE INVENTION

The present invention provides a bulk process which involves the steps of reacting a monomer mixture containing a maleimide compound first in a continuous stirred tank reactor to a desired level of monomer conversion and then further reacting the product therefrom in a plug flow reactor to further convert the monomers, and then the volatilizing the product therefrom to produce the desired maleimide copolymer. The maleimide copolymer exhibits reduced levels of oligomers, enhanced levels of glass transition temperature and impact strength, and reduced levels of Mellowness and viscosity. The maleimide copolymers are useful in the production of thermoplastic compositions, for example, blends of the maleimide copolymer with an impact modifier such as an acrylonitrile-butadiene-styrene graft copolymer, are useful for making molded articles which find application a automotive parts, for example, parts for under the hood applications which require the combined properties of chemical resistance, high heat distortion temperatures, and impact strength, for example, distributor caps.

DETAILED DESCRIPTION OF THE INVENTION

In the process of the present invention various monomers, such as acrylonitrile, N-phenylmaleimide and styrene are admixed in respective amounts in the presence of a solvent, a mercaptan, and suitable initiators in a feed tank and are then fed via feed stream into the top of a continuous stirred tank reactor which has a suitable motor toward driving stirring elements within tank shell. The continuous stirred tank reactor further preferably contains heat transfer element for controlling the temperature within the reactor. A first product is withdrawn from the reactor via first product stream which is then pumped via pump into the inlet end of plug flow reactor. The plug flow reactor has a first zone adjacent the inlet which allows the product to react within the plug flow reactor and which delivers product to an intermediate zone which is at an elevated temperature greater than that of the inlet, and which then respectively delivers material to a final reaction zone which further reacts the product at a temperature less than that of the intermediate zone. The material then leaves the final zone (and the plug flow reactor) via outlet as a second product flow stream which is then fed to devolatizer which removes volatile material such as solvent and residual monomer through the application of heat thereto to produce a volatile stream which may then be recaptured for solvent recovery for recirculation into the feed tank as solvent, and produces a final product stream which produces the desired maleimide copolymer product. The maleimide copolymer product may be in the form of pellets through utilization of a pelletizer attached to the downstream end of the devolatizer. In other words, the system preferably includes the feed tank, the continuous stirred tank reactor, the plug flow reactor, the devolatizer and the pelletizer. The initial monomer feed composition preferably comprises a solvent and a monomer mixture and various additives such as mercaptans and initiators. Preferably the monomer mixture comprises a maleimide compound and a monomer selected from the group consisting of vinyl aromatic compounds and vinyl cyanide compounds. Preferably the monomer mixture comprises a maleimide compound at a level of from 10 to 35 percent by weight based on the total weight of the monomer mixture, a vinyl aromatic compound present at a level of from 55 to 70 percent by weight based on the total weight of the monomer mixture, and a vinyl cyanide compound present at a level of from 5 to 40 percent by weight based on the total weight of the monomer mixture. In other words, the above weight percents are based on the total combined weight of maleimide compound, vinyl aromatic compound and vinyl cyanide compound.

Suitable solvents include methyl ethyl ketone, methylene chloride, ethylbenzene, and toluene, or the like. They can be used as one solvent alone or as a mixture of two combining solvents.

Suitable initiators include azo initiators and peroxide initiators. Suitable azo initiators include the symmetrical and the unsymmetrical azonitriles, such as 2,2'-azo-bis-isobutyronitrile and triphenylmethyl azo-benzene, or the like. Suitable peroxide initiators include alkyl peroxides and aryl peroxides, such as lauroyl peroxide and benzoyl peroxide.

The continuous stirred tank reactor is preferably operated at a temperature of between 75° C. and 110° C., more preferably between 80° C. and 95° C., and most preferably between 82° C. and 88° C. The continuous stirred tank reactor preferably has a residence time of between 1 to 10 hours, more preferably between 3 and 8 hours, and most preferably between 4 and 5 hours. The continuous stirred tank reactor preferably produces a first product which has a monomer conversion level of between 10 and 90 percent by weight based on the total weight of the monomer mixture, more preferably between 40 and 65 percent by weight, and most preferably between 50 and 55 percent by weight. The first product preferably has a residual maleimide monomer compound level of less than 2 percent by weight based on the total weight of the monomer mixture, more preferably less than 1.75 percent by weight thereof, and most preferably less than 1.5 percent by weight thereof. The first product is fed into the plug flow reactor which has a first zone, an intermediate zone, and a final zone. The first zone preferably has a temperature of between 85° C. and 115° C., the intermediate zone preferably has a temperature of between 100° C. and 120° C., and the final zone preferably has a temperature of between 95° C. and 105° C. Preferably the temperature of the intermediate zone is greater than that of the first zone and greater than that of the final zone, and the final zone temperature is preferably greater than that of the first zone. The residence time for the plug flow reactor is preferably between 0.5 hours and 3 hours, more preferably between 1 hour and 2 hours, and most preferably between 1.2 hours and 1.8 hours. The second product which is the product from the plug flow reactor preferably has a monomer conversion level of at least 5 percent greater than that of the first product based on the total weight of the monomer mixture, and most preferably has a monomer conversion level of between 50 percent by weight and 95 percent by weight based on the total weight of the monomer mixture, more preferably between 60 and 80 percent by weight thereof, and most preferably between 65 and 75 percent by weight thereof. The second product preferably has a residual maleimide monomer compound level of less than .5 percent based on the total weight of the monomer mixture, more preferably less than 0.3 percent by weight thereof, most preferably less than 0.2 percent by weight thereof.

The second product which is the product from the plug flow reactor then is fed to a devolatizer wherein residual volatiles such as solvent and residual monomer are further removed from the second product to produce a final product which is the maleimide copolymer. The maleimide copolymer may then be pelletized by a pelletizer. The maleimide copolymer product preferably has a residual maleimide monomer level of less than 500 parts per million based on the total weight of the maleimide copolymer, more preferably less than 400 parts per million, most preferably less than 350 parts per million. The maleimide copolymer preferably has a glass transition temperature of at least 140° C., and more preferably at least 144° C., and preferably has a viscosity of less than 2000 poise (at 260° C. and 1000 reciprocal second), more preferably less than 1900 poise (at 260° C. and 1000 reciprocal second), and has a yellowness index of preferably less than 20, more preferably less than 10.

The maleimide copolymer may be suitably blended with an impact modifier such as a vinyl aromaticvinyl cyanide-rubber graft copolymer to produce a final product which has relatively high heat distortion temperature and suitable impact properties.

The process of the present invention is useful for making the maleimide copolymers, particularly N-substituted maleimide copolymers as set out below.

The maleimide compound used in this invention includes, for example, maleimide, N-methylmaleimide, N-ethylmaleimide, N-phenylmaleimide, N-o-chlorophenylmaleimide, N-cyclohexylmaleimide, etc. Particularly preferred are N-phenylmaleimide, N-o-chlorophenylmaleimide and N-cyclohexylamleimide. They may be used alone or in combination of two or more.

The amount of the maleimide compound used is generally 10 to 70% by weight, preferably 15 to 65% by weight, and more preferably from 15 to 35 percent by weight based on the weight of the maleimide copolymer.

The vinyl aromatic compound may be selected from styrene, alphs-methylstyrene, methylstyrene, monobromostyrene, dibromostyrene, and mixtures thereof. They may be used alone or in combination of two or more. Preferred are styrene and alphamethylstyrene.

The amount of the vinyl aromatic compound used in the maleimide copolymer is generally 25 to 80 percent by weight, preferably 30 to 75 percent by weight, and more preferably 55 to 70 percent by weight based on the total weight of the maleimide copolymer.

The vinyl cyanide compound may be selected from acrylonitrile and methacrylonitrile. It is used in the maleimide copolymer an amount of 5 to 40 percent by weight, preferably 10 to 35 percent by weight, and more preferably 10 to 25 percent by weight based on the total weight of the copolymer.

Together with the above-mentioned essential components, other copolymerizable monomers can also be copolymerized. Such other monomers include methacrylic acid esters such as methyl methacrylate, ethyl methacrylate and the like; unsaturated acid anhydrides such as maleic anhydride, itaconic anhydride and the like; and so forth. They may be used alone or in combination of two or more. The amount of the monomer used is up to 50% by weight, preferably up to 30% by weight, more preferably up to 20% by weight.

Preferred specific combinations of the above monomers are:
(1) maleimide compound-styrene-acrylonitrile
(2) maleimide compound-styrene-acrylonitrile-methyl methacrylate.

In these combinations, the styrene may be partly or wholly replaced by alpha-methylstyrene to give a maleimide copolymer having higher heat resistance. Also flame retardancy can be imparted to the maleimide copolymer by substituting a halogenated styrene for a part or the whole of styrene.

Preferably the N-substituted maleimide-vinyl aromatic-vinyl cyanide copolymer comprises from 15 to 35 percent by weight in substituted maleimide based on the total weight of the copolymer, more preferably from 20 to 30 percent by weight thereof, and most preferably about 25 percent by weight thereof; preferably the N-substituted maleimide-vinyl aromatic-vinyl cyanide copolymer contains from 55 to 70 percent by weight of a vinyl aromatic compound, more preferably from 60 to 65 percent by weight thereof, and most preferably about 62 percent by weight thereof; and contains from 5 to 40 percent by weight vinyl cyanide compound based on the total weight of the copolymer, more preferably from 10 to 15 percent by weight thereof, and most preferably about 13 percent by weight thereof.

The high rubber graft copolymer useful as an impact modifier comprises (i) the rubber substrate, and (ii) a rigid polymeric superstrate portion grafted to the rubber substrate wherein the superstrate has a high level of vinyl cyanide compound therein. The rubber substrate is preferably present in the graft copolymer at a level of from 40 to 85 percent by weight (for example, 40 to 80 or 50 to 85 percent by weight) based on the total weight of the graft copolymer, more preferably from 50 to 80 percent by weight thereof, and most preferably from 50 to 60 percent by weight thereof; and the rigid superstrate is preferably present at a level of from 15 to 60 percent by weight (for example, 20 to 60 or 15 to 50 percent by weight) based on the total weight of the graft copolymer, more preferably from 20 to 50 percent by weight thereof, and most preferably from 40 to 50 percent by weight thereof.

Examples of rubbery polymers for the substrate include: conjugated dienes, copolymers of a diene with styrene, acrylonitrile, methacrylonitrile or $C_1$ to $C_8$ alkyl acrylate which contain at least 50% (preferably at least 65% by weight) conjugated dienes, polyisoprene or mixtures thereof; olefin rubbers i.e. ethylene propylene copolymer (EPR) or ethylene propylene non-conjugated diene (EPDM); silicone rubbers; or $C_1$ or $C_8$ alkyl acrylate homopolymers or copolymers with butadiene and/or styrene. The acrylic polymer may also contain up to 5% of one or more polyfunctional crosslinking agents such as alkylenediol di (meth) acrylates, alkylenetriol tri (meth) acrylates, polyester di (meth) acrylates, divinylbenzene, trivinylbenzene, butadiene, isoprene and optionally graftable monomers such as, triallyl cyanurate, triallyl isocyanurate, allyl (meth)acrylate, diallyl maleate, diallyl fumarate, diallyl adipate, triallyl esters of citric acid or mixtures of these agents.

The diene rubbers may preferably be polybutadiene, polyisoprene and copolymers of butadiene with up to 35% by weight of comonomers such as styrene, acrylonitrile, methylmethacrylate or $C_1$–$C_6$-alkylacrylate which are produced by free radical emulsion polymerisation. The acrylate rubbers may be cross-linked, particulate emulsion copolymers substantially of $C_1$–$C_8$-alkylacrylate, in particular $C_2$–$C_6$-alkylacrylate, optionally in admixture with up to 15% by weight of comonomers such as styrene, methylmethacrylate, butadiene, vinyl methyl ether or acrylonitrile and optionally up to 5% by weight of a polyfunctional crosslinking comonomer, e.g. divinylbenzene, glycol-bis-acrylates, bisacrylamides, phosphoric acid triallylester, citric acid triallylester, allylesters of acrylic acid or methacrylic acid, triallylcyanurate, triallylisocyanurate. Also suitable are mixtures of diene- and alkylacrylate rubbers and rubbers which have a so-called core/sheath structure, e.g. a core of diene rubber and a sheath of acrylate or vice versa.

Specific conjugated diene monomers normally utilized in preparing the rubber substrate of the graft polymer are generically described by the following formula:

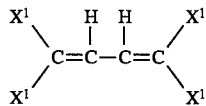

wherein $X^1$ is selected from the group consisting of hydrogen, alkyl groups containing from one to five carbon atoms, chlorine or bromine. Examples of dienes that may be used are butadiene, isoprene, 1,3-heptadiene, methyl-1,3-pentadiene, 2,3-dimethylbutadiene, 2-ethyl-1,3-pentadiene 1,3- and 2,4-hexadienes, chloro and bromo substituted butadienes such as dichlorobutadiene, bromobutadiene, dibromobutadiene, mixtures thereof, and the like. A preferred conjugated diene is 1,3-butadiene.

The substrate polymer, as mentioned, is preferably a conjugated diene polymer such as polybutadiene, polyisoprene, or a copolymer, such as butadiene-styrene, butadiene-acrylonitrile, or the like. The rubbery polymeric substrate portion must exhibit a glass transition temperature (Tg) of less than about 0° C.

Mixtures of one or more rubbery polymers previously described for preparing the monovinylidene aromatic graft polymers, or mixtures of one or more rubber modified monovinylidene aromatic graft polymers disclosed herein may also be employed. Furthermore, the rubber may comprise either a block or random copolymer. The rubber particle size is presented in weight average particle size for emulsion high rubber graft copolymer and in number average particle size for bulk low rubber graft copolymer. Therefore, the term "rubber particle size" or "the average rubber particle size" is associated to this annotation throughout the entire context of this invention. The rubber particle size used in this invention may be described as having an average particle size of select one of the following: 0.05 to 1.2 microns, preferably 0.08 to 0.2 microns, for the emulsion polymerized high rubber graft copolymer. The rubber substrate is preferably a particulate, highly crosslinked diene or alkyl acrylate rubber, and preferably has a gel content greater than 70%.

Preferred graft superstrates include copolymers of styrene and acrylonitrile, copolymers of methylstyrene and acrylonitrile and acrylonitrilemethylmethacrylate copolymers with up to 40% by weight of $C_1$–$C_6$ alkylacrylates or styrene. Specific examples of high rubber graft copolymers include but are not limited to the following: acrylonitrile-butadiene-styrene (ABS), acrylonitrile-styrene-butyl acrylate (ASA), methylmethacrylate-acrylonitrile-butadiene-styrene (MABS), acrylonitrile-ethylene-propylene-non-conjugated diene-styrene (AES).

Vinyl aromatic monomers which may be employed include styrene, alpha-methyl styrene, halostyrenes i.e. dibromostyrene, mono or di alkyl, alkoxy or hydroxy substitute groups on the nuclear ring of the monovinylidene aromatic monomer i.e. vinyl toluene, vinylxylene, butylstyrene, para-hydroxystyrene or methoxystyrene or mixtures thereof. The monovinylidenearomatic monomers utilized are generically described by the following formula:

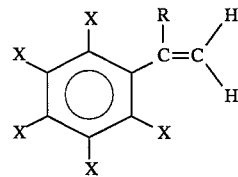

wherein X is selected from the group consisting of hydrogen, alkyl groups of 1 to 5 carbon atoms, cycloalkyl, aryl, alkaryl, aralkyl, alkoxy, aryloxy, and halogens. R is selected from the group consisting of hydrogen, alkyl groups of 1 to 5 carbon atoms and halogens such as bromine and chlorine. Examples of substituted vinylaromatic compounds include styrene, 4-methylstyrene, 3,5-diethylstyrene, 4-n-propylstyrene, α-methylstyrene, α-methyl vinyltoluene, α-chlorostyrene, α-bromostyrene, dichlorostyrene, dibromostyrene, tetrachlorostyrene, mixtures thereof and the like. The preferred monovinylidene aromatic monomers used are styrene and/or α-methylstyrene.

Comonomers which may be used with the monovinylidene aromatic monomer includes acrylonitrile, methacrylonitrile, $C_1$ to $C_8$ alkyl or aryl substituted acrylate, $C_1$ to $C_8$ alkyl, aryl or haloaryl substituted methacrylate, acrylic acid, methacrylic acid, iraconic acid, acrylamide, N-substituted acrylamide or methacrylamide, maleic anhydride, maleimide, N-alkyl, aryl or haloaryl substituted maleimide, glycidyl (meth)acrylates, hydroxy alkyl (meth)acrylates or mixtures thereof. The acrylonitrile, substituted acrylonitrile, or acrylic acid esters are described generically by the following formula:

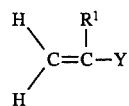

wherein $R^1$ may be selected from the same group set out for R as previously defined and Y is selected from the group consisting of cyano and carbalkoxy groups wherein the alkoxy group of the carbalkoxy contains from one or about twelve carbon atoms. Examples of such monomers include acrylonitrile, ethacrylonitrile, methacrylonitrile, α-chloroacrylonitrile, α-bromoacrylonitrile, methyl acrylate, methyl methacrylate, ethyl acrylate, butyl acrylate, propylacrylate, isopropyl acrylate and mixtures thereof. The preferred monomer is acrylonitrile and the preferred acrylic acid esters are ethyl acrylate and methyl methacrylate. It is also preferred that the acrylic acid esters, when included, are employed in combination with styrene or acrylonitrile.

The ungrafted rigid polymers (typically free of rubber) are resinous, thermoplastic polymers of styrene, α-methylstyrene, β-methylstyrene, methyl acrylate, methylmethacrylate, acrylonitrile, methacrylonitrile, maleic acid anhydride, N-substituted maleimide, vinyl acetate or mixtures thereof. Styrene/acrylonitrile copolymers, α-methylstyrene/acrylonitrile copolymers and methylmethacrylate/acrylonitrile copolymers are preferred. The impact modifier may be used to impact modify the ungrafted rigid polymers by blending therewith. For blends of an ungrafted rigid copolymer (such as styrene-acrylonitrile copolymer) with an emulsion high rubber graft (HRG) copolymer (such as acrylonitrile-butadiene-styrene graft copolymers), the rubber loading will typically range from 10 to 40% rubber based on the total weight of the rubber modified resin.

The ungrafted rigid copolymers are known and may be prepared by free radical polymerization, in particular by emulsion, suspension, solution or bulk polymerization. They preferably have weight average molecular weight of from 50,000 to 200,000.

The weight average molecular weight of the grafted rigid superstrate of the monovinylidene aromatic resin is designed to be in the range of 100,000 to 350,000. The ratio of monovinylidene aromatic monomer to the second and optionally third monomer may range from 90/10 to 50/50 preferably 80/20 to 60/40. The third monomer may optional replace 0 to 50% of one or both of the first and second monomers.

The high acrylonitrile-high rubber graft copolymer preferably contains from 40 to 80 percent by weight rubber based on the total weight of the high rubber-high acrylonitrile graft copolymer, more preferably from 45 to 60 percent by weight thereof, and most preferably about 50 percent by weight thereof. The superstrate grafted to the rubber of the high rubber graft copolymer, is preferably present at a level of from 20 to 60 percent by weight based on the total weight of the graft copolymer, more preferably from 40 to 55 percent by weight based on the total weight of the graft copolymer, and most preferably present at a level of about 50 percent by weight based on the total weight of the graft copolymer. The superstrate of the high rubber graft copolymer preferably contains from 60 to 70 percent by weight vinyl aromatic monomer, more preferably from 61 to 69 percent by weight thereof, and most preferably about 65 percent by weight thereof; and contains from 27 to 40 percent by weight unsaturated nitrile (vinyl cyanide) based on the total weight of the superstrate, more preferably contains from 29 to 35 percent by weight, most preferably contains about 31 percent by weight thereof.

The rubber substrate of the high rubber graft copolymer preferably has an average particle size of from 0.05 to 0.5 micron, preferably from 0.08 to 0.3 micron.

Preferably the thermoplastic compositions of the present invention further contain a low rubber graft copolymer which is obtained by bulk polymerization of vinyl aromatic monomer and vinyl cyanide monomer in the presence of a rubbery substrate. The low rubber graft copolymer preferably contains from 5 to 25 percent by weight rubber based on the total weight of the low rubber graft copolymer, more preferably contains from 10 to 15 percent by weight thereof, and most preferably contains about 11 percent by weight thereof. The low rubber graft copolymer further contains a superstrate which is by portion grafted to the rubbery substrate thereof, and the superstrate is preferably present at a level of from 75 to 95 percent by weight based on the total weight of the low rubber graft copolymer, more preferably present at a level of from 85 to 90 percent by weight thereof, and most preferably is present at a level of about 89 percent by weight thereof. The superstrate of the lower graft copolymer preferably contains from 22 to 28 percent by weight vinyl cyanide monomer, more preferably from 23 to 27 percent by weight thereof, and most preferably 25 percent by weight thereof; and contains the vinyl aromatic monomer at a level of from 72 to 78 percent by weight based on the total weight of the superstrate, more preferably 73 to 77 percent by weight thereof, and more preferably about 75 percent by weight thereof. The rubbery substrate is preferably in the form of particles, after rubber phase inversion and residual devolatilization, having an average particle size of from 0.5 to 2 micron, and more preferably from 1.0 to 2.0 micron. As mentioned above, the high rubber graft copolymer is obtained by emulsion polymerization, and the lower rubber graft copolymer is obtained by bulk (or bulk-suspension) polymerization.

The thermoplastic composition of the present invention, preferably contains the N-substituted maleimide-vinyl aromatic-vinyl cyanide copolymer at a level of from 30 to 45 percent by weight based on the total weight of the composition, more preferably at a level of from 35 to 40 percent by weight thereof, and most preferably present at a level of about 36 percent by weight thereof. The composition preferably contains the high rubber graft copolymer at a level of from 10 to 35 percent by weight based on the total weight of the composition, more preferably at a level of from 10 to 25 percent by weight thereof, and most preferably at a level of about 12 percent by weight thereof. The thermoplastic composition preferably further contains the low rubber graft copolymer at a level of from 25 to 55 percent by weight based on the total weight of the composition, more preferably at a level of from 35 to 50 percent by weight based on the total weight of the composition, and most preferably at a level of about 50 percent by weight thereof.

The thermoplastic compositions of the present invention exhibit the desired properties of a high heat distortion temperature and a relatively low viscosity. Preferably the heat distortion temperature of the present compositions is at least 98° C., and is more preferably at least 99° C. and most preferably at least 104° C. Preferably the thermoplastic composition has a heat distortion temperature of between 99° C. and 104° C. inclusive as measured by ASTM D648-82. The thermoplastic compositions also preferably have a viscosity of no greater than 2,000 poise as measured by ASTM D3835, and more preferably have a viscosity of less than 1900 poise, and most preferably have a viscosity of between 1800 poise and 1850 poise at 260° C. and 1000 reciprocal second.

The composition preferably has a total rubber content of between 5 and 20 percent by weight based on the total weight of the composition, more preferably between 10 and 15 percent by weight thereof, and most preferably about 14 percent by weight thereof.

The thermoplastic composition preferably has a N-substituted maleimide level of between 5 and 11 percent by weight based on the total weight of the composition, more preferably from between 7 and 10 percent by weight based on the total weight of the composition, and most preferably about 9 percent based on the total weight of the composition.

As set out above, the present invention provides thermoplastic compositions which exhibit desired levels of impact strength while also exhibiting enhanced heat distortion temperature without an unduly high viscosity level.

The maleimide copolymer obtained by the present process may be admixed with suitable impact modifiers such as acrylonitrile-butadiene-styrene graft copolymers containing butadiene rubber substrate and a superstrate grafted thereto which comprises styrene and acrylonitrile in respective ratios of between 75/25 and 70/30, wherein the butadiene rubber is present in the graft copolymer at a level of between 20 and 75 percent by weight based on the total weight of the graft copolymer. The maleimide copolymer and the impact modifier may be blended in respective amounts sufficient to enhance the impact strength of the maleimide copolymer, and preferably are blended in respective ratios of between 80:20 and 20:80.

EXAMPLES

Experiment series No. 1 is carried out using only a CSTR followed by a devolatilization unit. Reaction temperatures are controlled at about 105 to 110 degree Celsius using a free radical initiator, and the final NPMI-SAN has about 20% NPMI. The CSTR reaction intermediates and the final pellets are analyzed for residual NPMI levels, as given in Table 1. The average residual level of NPMI from the output of the CSTR mixture is about 0.5 to 1.5 percent, which accounts for about 1 to 3 percent of the total remaining monomers that are directly transferred to the devolatilization operation unit. Consequently, the residual NPMI level would be high in the final pellets, giving appearance of yellowness. High level of oligomers is also demonstrated because of high reaction temperature in the CSTR, leading to rigids of low Tg's, as given in Table 2.

TABLE 1

| Residual NPMI Data of CSTR Reaction Mixture and the NPMI-SAN Pellets for a Single CSTR Process | | |
|---|---|---|
| Sample No. | CSTR Temp. C./Conv. %/Res. NPMI % | NPMI-SAN Pellets Res. NPMI ppm |
| 1 | @108/@60/0.421 | 1866 |
| 2 | @108/@55/1.230 | 3219 |

Note:

1. The feed composition for Samples No. 1 & 2 is 18.4/69.6/12.0 for AN/ST/NPMI by weight percent;

2. For Sample No. 1, the feed also contains 0.005% AIBN as an initiator, the polymerization is, however, largely thermal initiated.

3. For Sample No. 2, the feed contains 0.01% benzoyl peroxide, the polymerization is partially chemical and partially thermal initiated;

4. Res.NPMI % is the remaining NPMI monomers in the total reaction mixture by weight percent.

TABLE 2

| Oligomer and Glass Transition Temperature Data for the NPMI-SAN Pellets From a Single CSTR Process | | | |
|---|---|---|---|
| Sample No. | Pellet composition AN/ST/NPMI, wt % | Oligomer wt % | Tg C. |
| 1 | 18.2/62.0/19.8 | 5.3 | 128 |

TABLE 2-continued

| Oligomer and Glass Transition Temperature Data for the NPMI-SAN Pellets From a Single CSTR Process | | | |
|---|---|---|---|
| Sample No. | Pellet composition AN/ST/NPMI, wt % | Oligomer wt % | Tg C. |
| 2 | 16.8/61.4/21.8 | 6.2 | 128 |

Experiment series No. 2 is carried out using a CSTR followed by a PFR and then followed by a devolatilization unit. Reaction temperatures are controlled at about 95 degree Celsius for the CSTR and 115 degree Celsius for the PFR. The final NPMISAN has about 25% NPMI. The CSTR and the PFR reaction intermediates and the final pellets are analyzed for residual NPMI levels, as given in Table 3. The residual NPMI level is reduced by about 10 to 5 times from the CSTR output to the PFR output, before the reaction mixture reaches the devolatilization unit. Therefore, very low residual level of NPMI is obtained in the final pellets. The residual NPMI in the NPMI-SAN from a CSTR/PFR process is nearly 10 times less as that from a single CSTR process.

Furthermore, Table 4 shows lower oligomer level than that given in Table 2 because of the lower reaction temperature in the CSTR, where probably more than 90% of the NPMI monomers are converted into polymer. That leads to higher glass transition temperature for the resulting NPMI-SAN.

Another advantage of the CSTR/PFR is the good optical properties as shown in Table 5, where NPMISAN rigids from different processes are compared in terms of their optical properties.

The CSTR/PFR process produced NPMI-SAN of better composition distribution comparing with the suspension process. That is, a narrow composition distribution is possible (which leads to a better miscibility towards ABS materials), and this is indirectly confirmed by the test results, particularly by the impact test results, for ABS blending experiments using bulk NPMI-SAN and suspension NPMI-SAN, as given in Table 6.

TABLE 3

| Residual NPMI Data of CSTR and PFR Reaction Mixtures and the NPMI-SAN Pellets For a CSTR/PFR Process | | | |
|---|---|---|---|
| Sample No. | CSTR Temp. C./ Conv. %/ Res. NPMI wt % | PFR Temp C./ Conv. %/ Res. NPMI wt % | NPMI-SAN Pellets Res. NPMI ppm |
| 3 | @95/@65/1.930 | 115/70/0.168 | 310 |
| 4 | @87/@55/1.45 | 115/65/0.133 | 341 |
| 5 | @86/@52/1.74 | 115/65/0.184 | 295 |

Note:

1. The feed solution for Sample No. 3, 4 & 5 is 18.0/17.5/64.5 for AN/ST/NPMI by weight percent;

2. For Sample No. 3, benzoyl peroxide at a 0.04% level, based on the total weight of monomers in the feed, is used as an initiator in the CSTR, and thermal initiation is applied for the PFR;

3. For Samples 4 & 5, lauroyl peroxide at a 0.035% level is used as an initiator in the CSTR, and benzoyl peroxide at a level of 0.01%, based on the total weight of monomers in the feed, is used as an initiator in the PFR.

TABLE 4

Oligomer and Glass Transition Temperature Data For the NPMI-SAN Pellets From a CSTR/PFR Process

| Sample No. | Pellet composition AN/ST/NPMI, wt % | Oligomer wt % | Tg C. |
|---|---|---|---|
| 3 | 14.6/61.1/24.6 | 2.9 | 140 |
| 4 | 13.7/61.3/25.0 | 2.4 | 144 |
| 5 | 13.2/61.7/25.0 | 2.5 | 144 |

TABLE 5

Optical Properties For NPMI-SAN Rigids by Suspension and Bulk Process

| NPMI-SAN Rigid | Process | Transmission (%) | Yellowness Index |
|---|---|---|---|
| SAN (25% AN) Control | Bulk | 79.37 | 2.68 |
| NPMI-SAN (24% NPMI) | Bulk (CSTR/PFR) | 76.84 | 8.13 |
| NPMI-SAN (26% NPMI) | Bulk (CSTR/PFR) | 70.82 | 17.07 |
| NPMI-SAN (26% NPMI) | Suspension | 53.32 | 35.11 |

Note:

The control sample is a SAN polymer, and all four rigids are molded into diskette specimens for optical property tests using a Hunter Color-meter.

Blend samples of Table 6 are made by compounding on a twin screw extruder at temperatures sufficient to melt resins used for the ABS blends. About 1% EBS wax (N,N'-ethylene bis(stearamide), a lubricant) and 0.25% Pluronic F-88 (TM for a nonionic difunctional block-polymers terminating in primary hydroxyl groups with molecular weights ranging from 1,000 to above 15,000; a dispersing agent) are added to the blends during compounding. The pellets thus obtained are injection molded into test specimens at a stock temperature of 260 degree Celsius and at a mold temperature of 66 degree Celsius. The specimens are tested for impact, HDT, gloss and other optical properties. The pellets are also measured to obtain viscosity data.

Viscosity, in poise, is measured using the compounded pellets on a MOBAY Viscometer or a Kayeness Viscometer at 260 degree Celsius and 1000 reciprocal second (ASTM D3835). Izod impact test is carried out using room temperature specimens, and the unit is ft.lb/in (ASTM D256). Dynatup impact is also tested using room temperature specimens, and the unit is ft.lb (ASTM D3039). HDT is measured using 1/4" bars at 264 psi, and the unit is degree Celsius (ASTM D648-82). The gloss is measured on a Gardner machine at 60 degree (ASTM D523). Opacity is measured on a 25D Hunter Colorimeter, and the unit is percent. Yeltowness Index is also obtained on a 25D Hunter Colorimeter (ASTM E313).

TABLE 6

Properties of ABS Blends Using Bulk NPMI-SAN and Suspension NPMI-SAN For High HDT Performance

| ABS blend | 1 (suspension NPMI-SAN) | 2 (bulk NPMI-SAN) |
|---|---|---|
| Viscosity | 1973 | 1693 |
| Izod impact | 2.7 | 3.1 |
| Dynatup impact | 5.3 | 11.3 |
| Std. Dev. | (3.0) | (5.0) |
| HDT | 101 | 104 |
| Gloss | 64 | 61 |
| Opacity | 83 | 83 |
| Yellowness Index | 29 | 24 |

Note:

The ABS blends No. 1 and 2 are compounded and molded using a formulation of bulk ABS 51.2 parts, a HRG (high rubber graft) 12.8 parts, and an NPMI-SANrigid of about 25% NPMI level (suspension NPMI-SAN for blend No. 1 and bulk NPMI-SAN for blend No. 2).

In conclusion, a new bulk process is invented for production of bulk NPMI-SANhigh heat rigids with improved narrow molecular weight distributions, improved oligomer levels, improved residual NPMI levels, and water-color appearance.

We claim:

1. A bulk process for making a maleimide copolymer product comprising the steps of:

(a) reacting a maleimide monomer mixture in a continuous stirred tank reactor, said monomer mixture comprising a maleimide monomer and a comohomer selected from the group consisting of vinyl aromatic compounds, vinyl cyanide compounds and acrylate compounds to form a first product having a monomer conversion level of between 10 and 90 percent by weight based on the total weight of monomer in said monomer mixture, (b) reacting said first product in a plug flow reactor to produce a second product having a monomer conversion level of at least 5 percent by weight greater than said first product based on the total weight of monomer in said monomer mixture, said second product having a monomer conversion level of between 50 and 95 percent by weight based on the total weight of said monomer mixture, and (c) devolatilizing said second product to produce said maleimide copolymer product.

2. The process of claim 1 wherein said first product has a monomer conversion level of between 40 to 65 percent based on the total weight of the monomer in said monomer mixture.

3. The process of claim 1 wherein said first product has a monomer conversion level of between 50 to 55 percent based on the total weight of the monomer in said monomer mixture.

4. The process of claim 1 wherein said continuous stirred tank reactor has a residence time of between 1.0 and 10.0 hours.

5. The process of claim 1 wherein said continuous stirred tank reactor has a residence time of between 3.0 and 8.0 hours.

6. The process of claim 1 wherein samd continuous stirred tank reactor has a residence time of between 4.0 and 5.0 hours.

7. The process of claim 1 wherein said continuous stirred tank reactor has an average temperature of between 75° C. and 100° C.

8. The process of claim 1 wherein said continuous stirred tank reactor has an average temperature of between 80° C. and 95° C.

9. The process of claim 1 wherein said continuous stirred tank reactor has an average temperature of between 82° C. and 88° C.

10. The process of claim 1 wherein said plug flow reactor has a residence time of between 0.5 hours and 3.0 hours.

11. The process of claim 1 wherein said plug flow reactor has a residence time of between 1.0 hours and 2.0 hours.

12. The process of claim 1 wherein said plug flow reactor has a residence time of between 1.2 hours and 1.8 hours.

13. The process of claim 1 wherein said plug flow reactor has a feed zone, an intermediate zone and a final zone, said first product being fed into said first zone, said intermediate zone receiving material from said first zone, said intermediate zone having a temperature of between 100° C. and 120°, said final zone receiving material from said intermediate zone and said final zone having a temperature less than said intermediate zone, said final zone temperature being between 95° C. and 105° C.

14. The process of claim 1 wherein said second product has a monomer conversion level of between 60 and 80 percent by weight based on the total weight of the monomer mixture.

15. The process of claim 1 wherein said second product has a monomer conversion level of between 65 and 75 percent by weight based on the total weight of the monomer mixture.

16. The process of claim 1 wherein said maleimide copolymer product has a residual maleimide monomer level of less than 500 parts per million by weight based on the total weight of the maleimide copolymer.

17. The process of claim 1 wherein said maleimide copolymer has a glass transition temperature of at least 140° C. and a viscosity of less than 2000 poise at 260° C. and 1000 reciprocal second as measured by ASTM D3835.

18. The process of claim 1 wherein said monomer mixture comprises an initiator selected from the group consisting of azo initiators and peroxide initiators.

19. The process of claim 1 consisting essentially of said steps a, b and c.

20. The process of claim 1 wherein said monomer mixture comprises (i) a maleimide compound, (ii) a vinyl aromatic compound and (iii) a vinyl cyanide compound.

21. The process of claim 20 wherein said maleimide compound is present at a level of from 15 to 35 percent by weight based on the total weight of compounds (i), (ii) and (iii), said vinyl aromatic compound being present at a level of from 55 to 70 percent by weight based on the total weight of said compounds (i), (ii) and (iii), and said vinyl cyanide compound being present at a level of from 5 to 40 percent by weight based on the total weight of said compounds (i), (ii) and (iii).

* * * * *